Feb. 4, 1941. W. ERNST Re. 21,708
PRESS CONTROL MECHANISM
Original Filed May 20, 1931 2 Sheets-Sheet 1
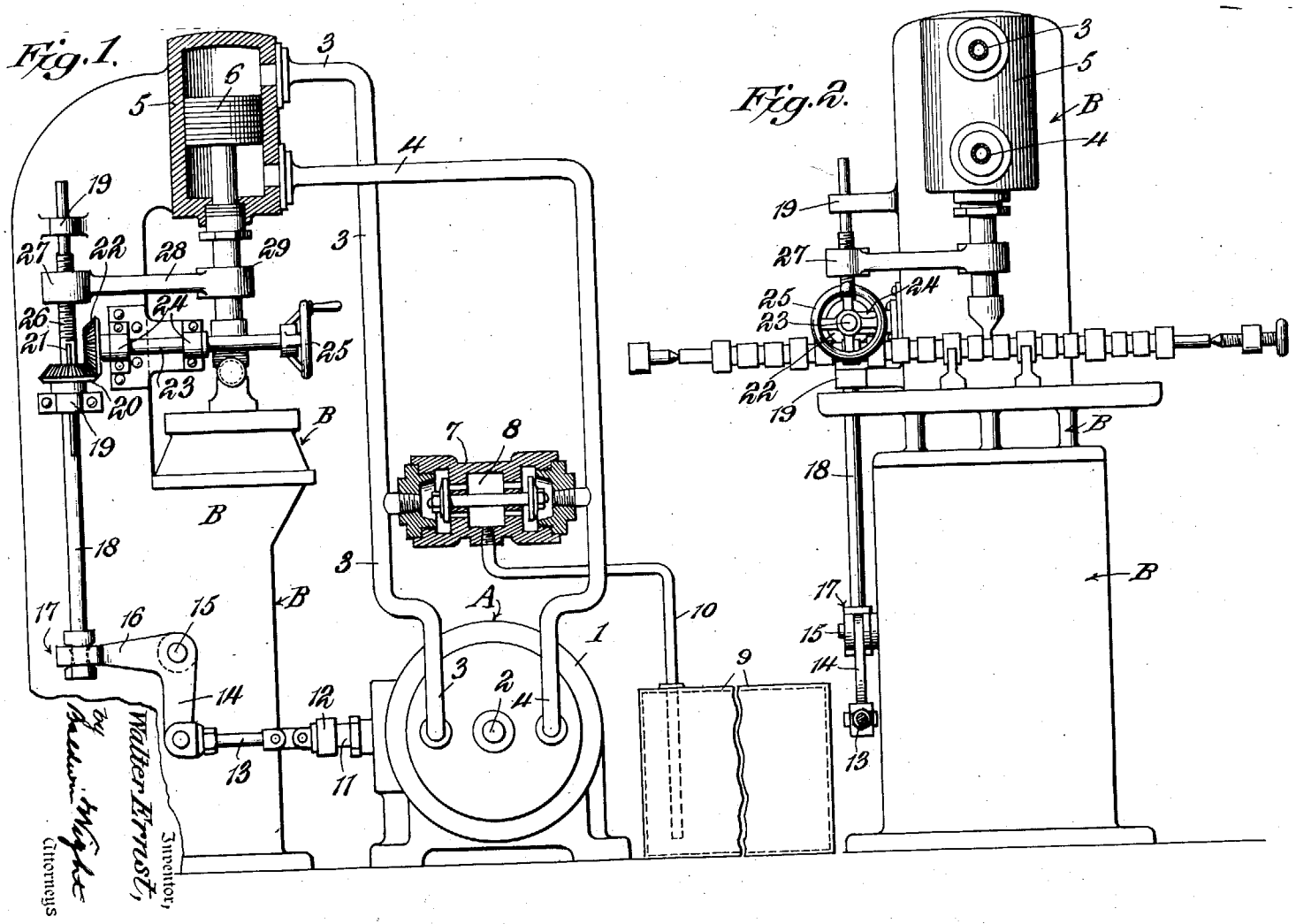

Feb. 4, 1941. W. ERNST Re. 21,708
PRESS CONTROL MECHANISM
Original Filed May 20, 1931 2 Sheets-Sheet 2
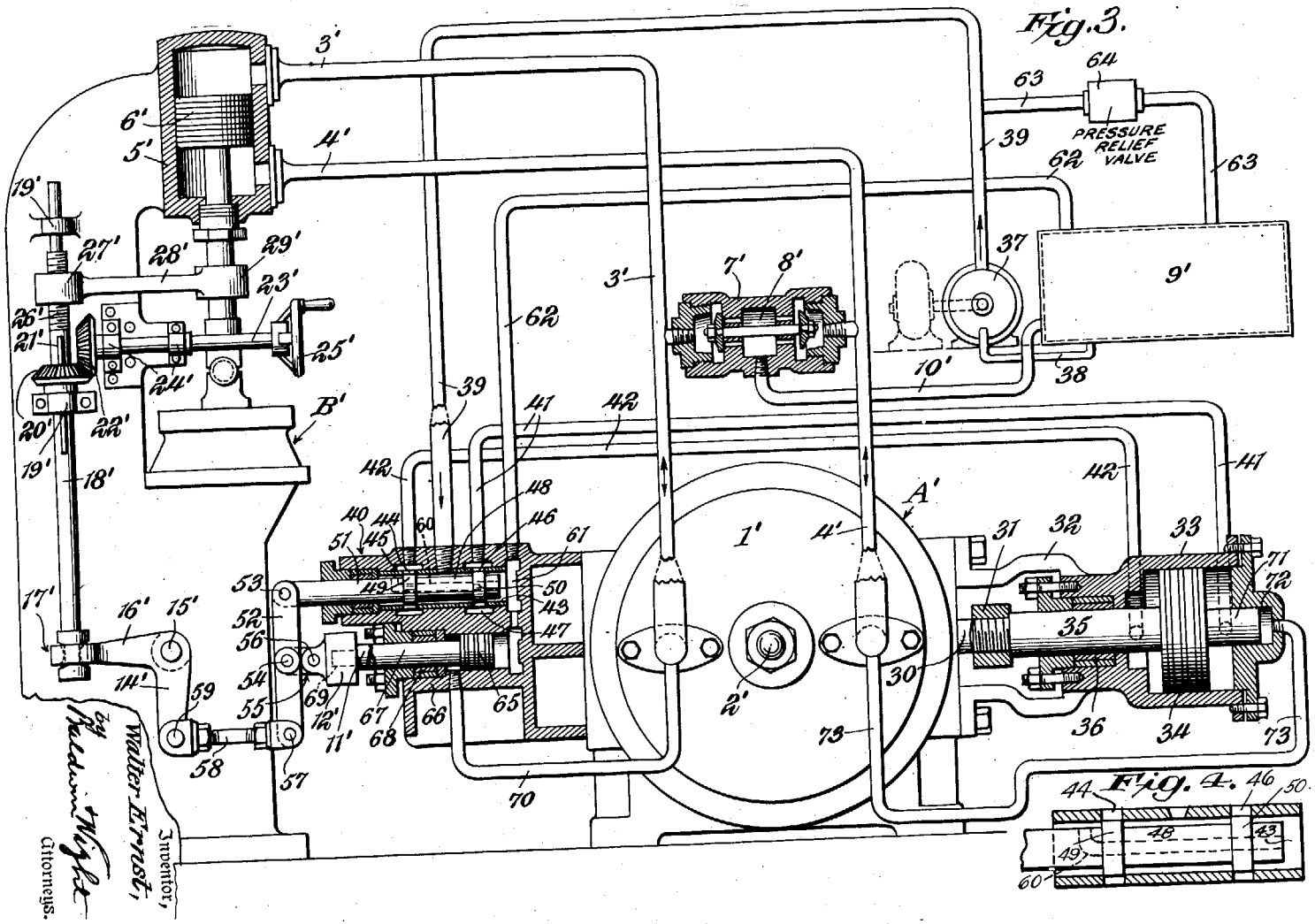

Reissued Feb. 4, 1941

Re. 21,708

UNITED STATES PATENT OFFICE 21,708

PRESS CONTROL MECHANISM

Walter Ernst, Mount Gilead, Ohio, assignor, by mesne assignments, to The Hydraulic Press Corporation, Inc., Wilmington, Del., a corporation of Delaware Original No. 2,053,184, dated September 1, 1936, Serial No. 538,827, May 20, 1931. Application for reissue October 22, 1936, Serial No. 107,041

3 Claims. (Cl. 60—52)

The invention generally relates to hydraulic presses, particularly those of the type wherein a pump supplies the fluid pressure employed to move the platen toward and from the work, and primarily has for its object to provide a novel manually actuated control linkage by employment of which it is possible to very accurately control the output of the pump and thereby enable use of the press on jobs requiring great accuracy.

The novel control mechanism referred to may be used in combination with presses employing various types of pumps, preferably those capable of being reversed and of having their output varied to meet the demand of particular operations. In this disclosure the invention is illustrated in combination with one acceptable form of such pump, namely, the Hele-Shaw type disclosed in United States Letters Patent, 1,250,170 of December 18, 1917. Briefly stated, such pumps include a plurality of radially arranged cylinders and pistons, the rate and direction of discharge effected by which depend upon the eccentricity of the pistons relative to a drive shaft and the respectively associated cylinders. The pistons are usually carried by a shiftable ring or the like, which, by means of a cross head or other control element, may be shifted to vary the eccentricity of the pistons and to thereby effect control of the pump discharge. Various other kinds of variable discharge pumps are known in the art, and it is to be understood that the present invention relates to control mechanism which is also adaptable for use in connection with pumps differing in some respects from the pump referred to above and illustrated in this particular disclosure.

In its more detailed nature the invention resides in the combination with a press, pump and pump circuit of the character stated of a novel control means which is manually actuated to bring about the desired control movement of the pump controlling devices and which consists in a control rod rotatable and slidable in stationary bearings and having thread connection with the press platen or some other part movable linearly with the platen, a gear held against linear movement and having spline connection on the rod, a hand wheel and gear for imparting rotation to the gear and rod, a lever having connection with the pump controlling devices, and means connecting the lever and rod so that movement of the rod in one direction or the other will be imparted to the pump controlling devices to effect the desired control of the pump and press.

Another object of the invention is to provide in combination with a hydraulic press and the pump and its controlling devices which effect operation thereof, power actuated means for operating the pump controlling devices, and manually actuated control means of the character stated for controlling the power actuated means to cause the press platen to move in exact proportion to the control movement of the hand wheel, stopping automatically and accurately under control of the linear movement of the platen regulated by the particular control means adjustment.

The invention further resides in the provision in the manually controlled and power operated means above referred to of means rendering the press thus equipped self corrective so that if the platen should tend, during idle standing or otherwise, to coast or creep past the point at which it was or should be automatically stopped, the resultant linear movement of the platen will act through the novel control means or linkage referred to to automatically bring about a pump output to counteract the creeping or coasting movement and return to or hold the platen at its desired stop position.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:

Figure 1 is a somewhat diagrammatic side elevation of a press embodying a simple form of the invention adapted for full manual control, the press cylinder being shown in section for purposes of illustration.

Figure 2 is a front elevation of the press shown in Figure 1, the connection of the circuit pipes with the cylinder and the control means connecting link being shown in cross section.

Figure 3 is a somewhat diagrammatic side elevation and part section illustrating a press embodying a combined power actuated and manually controlled means for effecting the desired operation and adjustments of the press pump.

Figure 4 is a detail view in longitudinal section and on an enlarged scale of a pilot valve cylinder liner and piston valve element.

A practical embodiment of the invention is illustrated in the accompanying drawings as being connected to a pump A of the radial, reversible, variable discharge type. In order to make the operation of the pump and control mechanism more readily understood, the pump is illustrated as having hydraulic connection with a hydraulic press or the like B, it however being understood that specific details of the press and hydraulic circuit constitute no part of the present invention.

As shown, the pump A includes a casing 1, a shaft 2 which may be driven from any suitable source of power, and combined intake and discharge pipes 3 and 4. The pipe 3 is connected to the upper end of the cylinder 5 of the press B and the pipe 4 is connected to the lower end of the cylinder. When the pump is discharging through the pipe 3, the ram 6 of the press will be moved downwardly to perform a pressing or other like operation, the pump at this time receiving its intake principally from the lower end of the press cylinder. When the pump is reversed so as to discharge in the opposite direction, that is, through the pipe 4, fluid will be drawn from the upper end of the cylinder and delivered under pressure to the lower end thereof to return the ram to its upper position. A compensating valve 7 of the kind fully disclosed in the United States patent to Walter Ernst 1,653,350, dated December 20, 1927, is connected across the pipes 3 and 4 and has its central chamber 8 connected to a tank 9 by means of a pipe 10 for compensating for the unequal effective cross sectional area of the cylinder 5 above and below the piston 6 in a manner well understood in the art.

The above described parts will be recognized as conventional. I will now proceed to describe the control mechanism forming the subject matter of my present invention, a simple embodiment of which is disclosed in Figures 1 and 2 of the drawings and designated as the manually controlled and operated form, a second or manually controlled power operated form also being disclosed in Figure 3 of the drawings.

In the simple form of the invention disclosed in Figure 1, 11 designates the control rods which project at one side of the pump A and which are connected in the usual manner by cross head 12. The cross head 12 is connected by a suitable link connection 13 to one arm 14 of a bell crank lever which is pivoted as at 15 to the frame of the press B. The other arm 16 of the bell crank lever is connected as at 17 to a control rod 18.

The control rod 18 is rotatably and slidably supported in bearings 19 carried by the press frame, and a bevel gear 20 is spline connected upon the rod as at 21. The gear 20 meshes with a gear 22 carried by the control shaft 23 so that rotation imparted to the shaft 23 will be transmitted through the gears 22 and 20 to the rod 18. The control shaft 23 is rotatably mounted in bearings 24 supported on the press frame and is equipped with a hand wheel 25 by which it may be conveniently rotated by the operator of the press.

The control rod 18 is also provided with a threaded portion 26 which passes through a threaded bore formed in the boss 27 carried by a control arm 28, which is in turn rigidly secured as at 29 to the press ram to which the piston 6 is connected.

From the foregoing description it will be obvious that if the hand wheel 25 is turned clockwise it will result in rotation toward the left and linear movement downwardly of the control rod 18 relative to the linearly movable press ram. This downward movement of the control rod 18 will rock the bell crank 14—16 and force the pump control rods 11 toward the right. This movement of the pump control rods 11 will bring about a pump pressure output through the pipe line 4 causing the piston 6 to move upwardly.

In travelling upwardly the piston ram carries the arm 28 and the rod with it and when the ram has travelled the distance predetermined by initial adjustment of the hand wheel 25 it will have acted through connections 28, 18, 16—14, 13 and 12 to move the rods 11 to the left to their initial neutral position thus automatically cutting off the pump output.

Obviously if the hand wheel is rotated in a counter-clockwise direction, movement in the reverse direction will be effected and pressure supplied through the pipe line 3 into the top of the cylinder 5 will serve to force the piston downwardly. Thus by manipulation of the hand wheel 25 very accurate control of the movement of the press platen may be effected, making it possible to employ a press thus equipped in jobs requiring great accuracy such as the straightening of cam shafts and the like. Turning of the hand wheel acts to lift or lower the platen. The lifting or lowering movement will continue as long as the hand wheel is being manipulated and the movement will be in exact proportion to the amount of rotation of the hand wheel. It will be observed that in effecting control of the press the two linearly movable parts, namely, the press ram and the control rod 18 are given relative linear movement for the purpose of controlling the degree of movement to be imparted to the press ram at a given interval. When the press ram is to be moved downwardly by action of the pump the control rod is first moved upwardly to properly adjust the pump and when the downward movement of the press ram thus effected has returned the control rod 18 to its initial position at rest or neutral position, it will have reset the pump to its neutral position and travel of the press ram will thus be automatically stopped.

The equipment above described is also self corrective. If during the operation or when inactive the press platen should tend to coast or creep slightly beyond the predetermined stop position it will move the control rod 18 past its neutral position to thereby bring about a reversal of pump action and set up a small pump output in the reverse direction thus counteracting the creeping tendency.

In Figure 3 of the drawings I have disclosed the invention in a form in which the pump adjustment is manually controlled and power operated as distinguished from the manually controlled and manually operated form disclosed hereinbefore. In the disclosure of this modified form of the invention the same pump structure, press structure and manual control mechanism is employed and since these parts are constructed and operated in the same manner as hereinbefore described the same reference characters primed are applied to like parts, namely, A', B', 1' to 12', 14' to 29'.

In this form of the invention, in addition to the control rods 11' and 12' the pump A' is provided with additional control rods 30 which project from the side of the pump opposite the side at which the first mentioned control rods project.

The additional control rods 30 are connected by a cross head 31.

A bracket 32 is mounted in fixed relation to the pump casing and serves to support a hydraulic cylinder 33 in which is mounted a double acting hydraulic piston 34. The piston 34 is provided with a stem 35 which is connected to move with the cross head 31 and extends inwardly toward the pump through a suitable packing 36 provided therefor in the pump casing or cylinder 33.

For moving the piston 34 to shift the control elements 30, 31 and to vary the discharge of the pump, means are provided for applying fluid pressure to either side of the piston. In the form shown, this pressure-applying means includes a low pressure pump 37 arranged to receive fluid from the tank 9' through the medium of a suction pipe 38 and to discharge fluid under a relatively low pressure through a pipe 39 to a pilot valve generally designated 40 which controls the application of pressure on the respective sides of the piston 34 through pipes 41 and 42.

The pilot valve 40 includes a liner or sleeve 43 mounted in a bore in the pump casing. This liner is provided with ports 44 communicating with an annular recess 45 in the casing and with ports 46 axially spaced from the ports 44 and communicating with an annular recess 47. The discharge pipe 39 leading from the low pressure pump 37 communicates with the interior of the sleeve or liner 43 midway between the ports 44 and the ports 46. Mounted in the liner 43 is a piston valve 48 having spaced heads 49 and 50 formed on a stem 51, the center-to-center distance between the heads 49 and 50 being the same as the center-to-center distance between the ports 44 and the ports 46. The heads 49 and 50 are slightly wider than the associated openings 44 and 46, so that, when the piston valve is in its Figure 3 position, the heads 49 and 50 will just cover the ports 44 and 46 respectively.

The stem 51 of the piston valve extends outwardly through suitable packing for pivotal connection with the upper end of a floating lever 52 as at 53. The floating lever 52 is pivotally connected at an intermediate point as at 54 to a link 55, in turn pivotally connected to the cross head 12' as at 56, and the lower end of the floating lever is pivoted as at 57 to a link 58 which is in turn pivoted, as at 59, to the lower end of the manually operated bell crank lever arm 14'.

In operation, if the control devices 25'—14' are moved in a direction to move the piston valve 48 to the right from its Figure 3 position, low pressure fluid from the pipe 39 will enter the liner between the heads 49 and 50 and will flow out through the ports 46 and annular recess 47, since the head 50 has been moved to the right of the ports 46. The fluid will flow from the recess 47 through the pipe 41 to the right of the piston 34, and will move the latter to the left, fluid contained in the cylinder 33 to the left of the piston 34 being expelled through the pipe 42, the annular recess 45, the ports 44, and internal passage 60 formed in the piston valve 48, a chamber 61 in the casing at the inner end of the liner 43, and an exhaust pipe 62 which leads back to the tank 9'. As the piston 34 is moved to the left in this manner, the cross head 31 and the rod 30 will be also moved to the left and will adjust the pump A to effect discharge through the pipe 3' of the pump. Assuming that the manually operated control devices have been adjusted to move the valve 48 to a definite position to the right of the Figure 3 position, movement of the piston 34 and resultant movement of the cross heads 31 and 12' at opposite sides of the pump will continue until the valve 48 has been returned nearly to its Figure 3 position through the rocking of the floating lever 52 about the pivot 57 resulting from movement of the cross head 12' imparted to the floating lever through the link 55. As soon as the piston valve 48 has been moved to this position, further flow of liquid to the right hand end of the cylinder 33 will be arrested and the piston 34, the cross heads 31 and 12' will be brought to rest.

Similarly, if the manually operable control devices are moved to bring the piston valve 48 to a predetermined position to the left of its Figure 3 position, fluid from the discharge pipe 39 will be directed through the pipe 42 to the left hand end of the cylinder 33 so as to move the piston 34 to the right, the movement of the piston being transmitted through the cross heads 31 and 12' to the rods 30 and 11' of the pump to effect discharge through the pipe 4' of the pump. When the predetermined movement of the cross head 12' to the right has taken place, the piston valve 48 will be automatically returned nearly to its Figure 3 position so as to prevent further flow of low pressure fluid to the cylinders 33, thereby bringing the pump cross heads 12' and 31 to rest. From the foregoing, it will be observed that different degrees of movement of the control hand wheel 25' and connected control devices and the piston valve 48 will effect correspondingly different degrees of movement of the pump cross heads 12' and 31 so as to produce the desired direction and rate of discharge from the pump.

When the piston valve 48 is in its Figure 3 position, wherein the ports 44 and the ports 46 are covered by the heads 49 and 50 respectively, fluid cannot flow through the pipe 39. In order to relieve the pressure in the pipe 39 when the valve is in this position, a relief pipe 63, including a pressure operated relief valve 64 of any suitable form, is connected between the pipe 39 and the tank 9'.

In accordance with a further feature of the invention, means are provided for limiting the maximum pressure of fluid discharged by the pump. For limiting the pressure of fluid discharged through the pipe 3', a piston 65 mounted in a cylinder 66 has a stem 67 extending through packing 68 for connection with the cross head 12' as at 69. The cylinder 66 communicates at its left hand end, as viewed in Figure 3 with the pipe 3' of the pump by means of a pipe 70, so that the pressure in the cylinder 66 and to the left of the piston 65 is always the same as the pressure in the pipe 3'. Assuming that the piston valve 48 has been moved to the right, and that the piston 34, and the cross head 31, have been moved to the left to a predetermined position in the manner described above, these parts will remain in such position until the pressure in the pipe 3' builds up to a predetermined extent, at which time this pressure, acting through the pipe 70 and in the cylinder 66, will act upon the piston 65 to move the latter to the right, this movement being transmitted through the stem 67 and cross head 12' to the rods 11' and to the floating rings of the pump, thus moving the floating rings to the right and reducing the discharge rate of the pump.

It is desirable that means be also provided for limiting the maximum discharge pressure of the pump when the cross heads 12' and 31 and the floating rings of the pump have been moved to the right so as to discharge through the pipe 4' in the manner already described. For this purpose, the piston 34 is provided with a plunger 71 extending into a bore 72 in the head of the cylinder 33, the end of the bore communicating at all times with the pipe 4' through the medium of a pipe 73. Thus, when the piston 34 and cross heads 12' and 31 have been moved to the right in the manner described above so as to effect a predetermined rate of discharge through the pipe 4', pressure built up to a predetermined extent in the pipe 73 and the bore 72 will act upon the plunger 71 to move the latter and the piston 34 to the left. It will be understood that the unit pressure acting upon the relatively small area of the plunger 71 is much greater than the unit pressure acting upon the relatively large area of the left hand face of the piston 34, so that this latter pressure is overcome by the high pressure in the bore 72. This results in movement of the piston 34 and cross heads 12' and 31 to the left, and the reducing of the rate of discharge through the pipe 4' so as to limit the discharge pressure.

As shown in Figure 4, the valve heads 49 and 50 are of the same widths as the associated ports 44 and 46, i. e., the valve heads are fitted with zero lap. Therefore, as soon as the piston 34 tends to move to the left, it immediately produces a corresponding movement of the crosshead itself and with it the links 52 and valve 48, and opens port 44, permitting the oil to escape through pipe 42, port 44 into pipe 39 and force it out through the relief valve 64, line 63. Although a very small movement of piston 34 must take place to move pilot valve head 50 out of the way, this movement is taken care of by the elasticity of the oil in pipe line 42. As soon as an ever-so-slight movement of piston 50 is produced, the oil can escape through port 44 into line 39. The same is true on reversal on the downward stroke when the pressure gets into line 70 and behind piston 65. This tends to force piston 34 to the right, compressing the oil in line 41; also moving valve head 50 to the right and opening port 46 so that the oil can escape through line 39, forcing open relief valve 64 and escaping into the tank.

In order that this form of the invention may be more readily understood, a complete operating cycle of the circuit shown in Figure 3 will now be described.

Assuming that the parts are in the relative positions shown in Figure 3, the pump will be "on neutral", that is, no fluid will be delivered through either of the pipes 3' and 4'. When it is desired to effect a downward movement of the ram 6', the control devices are actuated to move the control rod 18' upwardly causing the bell crank lever arm 14' to move to the left to an extent dependent upon the desired rate of discharge of the pump and the desired distance of travel of the press platen. This will move the piston valve 48 to the right to admit fluid from the pipe 39 to the pipe 41 and to the right hand end of the cylinder 33. The piston 34 will be thereby moved to the left, movement of the piston being transmitted to the pump rings through the cross head 31 and rods 30. When the pump rings have been moved to the left the desired distance to a position dependent upon the original degree of movement of the hand wheel 25', the piston valve 48 will be returned to its Figure 3 position as described above, and the pump rings will be brought to rest. The pump will then deliver fluid under pressure to the upper end of the cylinder 5', the ram thereby being driven downwardly. When the ram, and consequently the rod 18', have been moved downwardly to an extent dependent upon the amount of previous rotation of the hand wheel 25', the bell crank lever 16', link 58, floating lever 52 and pilot valve 40 will function to admit fluid to the left of piston 34 to move the latter and the pump rings to the right until in neutral position, at which time discharge from the pump will cease and the ram will be brought to rest.

If, during its downward travel, and before the automatic completion of its downward stroke as above outlined, the ram should meet with resistance in such a manner as to build up an undesirable excess pressure in the pipe line 3', when this excess pressure has reached a predetermined value the piston 65 will be acted upon to move the cross head 12' toward the right, thus adjusting the pump rings and reducing the discharge rate of the pump.

In order to return the ram 6 to its upper position, the hand wheel 25' will be rotated in the reverse direction and to the desired degree, thereby effecting a movement of the piston valve 48 to the left and directing fluid from the pipe 39 to the left hand end of the cylinder 33, thereby moving piston 34, and the cross heads 31 and 12', to the right in the manner described, for the purpose of directing fluid under pressure through the pipe line 4' into the lower portion of the cylinder 5'. Should excess pressure be built up in the pipe line 4' as above-described, this pressure will be transmitted through the pipe 73 to the bore 72 and will act upon the plunger 71 to reversely move the piston 34 and the cross head 31 toward the left as far as is necessary to properly decrease the rate of discharge through the pipe line 4' and thus limit the pressure in that line. When the pump rods 30 have been moved to the right the predetermined distance determined by the degree to which the hand wheel has been rotated, the pilot valve 48 will have been returned to its neutral position illustrated in Figure 3 and the pump rings will be automatically brought to rest. The pump will then deliver fluid under pressure to the lower end of the cylinder 5', the ram thereby being driven upwardly. When the ram, and consequently the rod 18' have been moved upwardly to an extent dependent upon the amount of previous rotation of the hand wheel 25', the bell crank lever 16', link 58, floating lever 52 and pilot valve 40 will function to admit fluid to the right of piston 34 to move the latter and the pump rings to the left until in neutral position, at which time discharge from the pump will cease and the ram will be brought to rest.

It will be apparent that the control mechanism disclosed herein may be used in connection with various kinds of pumps other than the type illustrated herein, and that various other changes may be made without departing from the scope of the invention as defined in the claims.

From the foregoing description taken in connection with the accompanying drawings, it is thought that the novel details of construction, the manner of use and the advantages of my invention will be readily apparent to those skilled in the art to which it relates.

I claim:

1. In a hydraulic press, the combination with the press frame and the travelling platen, of means for operating the platen in both directions including a variable output pump for imparting movement to the platen including a member disposed in a neutral position when the pump is inactive and adapted to be moved from its neutral position to render said pump active in the desired degree for imparting movement to the platen, an arm movable with the platen and including a threaded bore, a control rod slidably and rotatably supported on the press frame at the rear of the press and having a threaded portion operable in the threaded bore, linkage connecting said rod and said member to move in unison, a bevel gear spline-connected on the rod, and an operating shaft supported on the press frame and having secured thereon a bevel gear enmeshed with the rod carried gear for imparting rotation therethrough to the rod, said shaft extending forwardly to a point in front of said platen, and a hand wheel on the front end of said shaft.

2. The combination with a hydraulic press including a cylinder and a cooperating ram therein, of means for operating the ram in both directions including a variable discharge pump for supplying fluid under pressure to said cylinder for driving said ram, said pump having a shiftable flow control element adapted to occupy a neutral position in which the pump runs light and does not discharge fluid and adapted to be moved to a discharge-effecting position in which the pump will discharge fluid to said cylinder, progressive movement of said element from said discharge-effecting position to said neutral position producing a gradual diminishing of the pump discharge to zero; and means for moving said flow control element in such manner as to effect predetermined exact degrees of movement of the ram under delicate control and without undue loss of power due to wire drawing comprising a rod having threaded connection with said ram and being movable with the latter, means operatively connecting the rod to the control element of said pump, and means for rotating said rod to vary its position relative to said ram.

3. The combination with a hydraulic press including a cylinder and a cooperative ram therein, of means for operating the ram in both directions including a variable discharge pump for supplying fluid under pressure to said cylinder for driving said ram, said pump having a shiftable flow control element adapted to occupy a neutral position in which the pump runs light and does not discharge fluid and adapted to be moved to a discharge-effecting position in which the pump will discharge fluid to said cylinder, progressive movement of said element from said discharge-effecting position to said neutral position producing a gradual diminishing of the pump discharge to zero, mechanism operatively interconnecting said ram with said flow control element, said mechanism being continually movable during the motion of said ram and responsive to the travel of said ram for gradually shifting said flow control element in a flow reducing direction, and a screw actuated fine adjustment device associated with said mechanism and interposed between said ram and said flow control element for varying the relative position of said flow control element relatively to said ram by finely graduated increments.

WALTER ERNST.